United States Patent
Venkatapathy et al.

(10) Patent No.: US 9,473,637 B1
(45) Date of Patent: Oct. 18, 2016

(54) LEARNING GENERATION TEMPLATES FROM DIALOG TRANSCRIPTS

(71) Applicant: Xerox Corporation, Norwalk, CT (US)

(72) Inventors: Sriram Venkatapathy, Grenoble (FR); Shachar Mirkin, Meylan (FR); Marc Dymetman, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/810,817

(22) Filed: Jul. 28, 2015

(51) Int. Cl.
   H04M 3/00 (2006.01)
   H04M 5/00 (2006.01)
   H04M 1/64 (2006.01)
   G10L 21/00 (2013.01)
   H04M 3/51 (2006.01)
   H04M 3/42 (2006.01)
   G06F 17/28 (2006.01)

(52) U.S. Cl.
   CPC ........ H04M 3/5191 (2013.01); G06F 17/2818 (2013.01); G06F 17/2881 (2013.01); H04M 3/42221 (2013.01); H04M 3/5175 (2013.01)

(58) Field of Classification Search
   CPC . H04M 2250/74; H04M 3/5183; H04M 3/51
   USPC ............... 379/265.07, 88.01, 88.03, 265.12, 379/265.11, 265.01, 265.05, 265.09; 704/270.1
   See application file for complete search history.

(56) References Cited

U.S. PATENT DOCUMENTS

| | | | |
|---|---|---|---|
| 6,947,885 B2 | 9/2005 | Bangalore et al. | |
| 7,647,225 B2 * | 1/2010 | Bennett ............... | G06F 17/3043 704/251 |
| 8,849,670 B2 * | 9/2014 | Di Cristo ............. | G06F 17/279 704/257 |
| 9,214,001 B2 * | 12/2015 | Rawle ................... | G06Q 90/00 |
| 2006/0235696 A1 * | 10/2006 | Bennett .................. | G06F 17/27 704/270.1 |

OTHER PUBLICATIONS

Axelrod, "Natural Language Generation in the IBM Flight Information System." In *Proceedings of the ANLP-NAACL 2000 Workshop on Conversational Systems*, Association for Computational Linguistics, pp. 21-26 (2000).

Bangalore, et al., "Computing Consensus Translation from Multiple Machine Translation Systems," Automatic Speech Recognition and Understanding, ASRU'01. *Workshop on*. IEEE, pp. 351-354 (2001).

(Continued)

*Primary Examiner* — Thjuan K Addy
(74) *Attorney, Agent, or Firm* — Fay Sharpe LLP

(57) ABSTRACT

Agent utterances are generated for implementing dialog acts recommended by a dialog manager of a call center. To this end, a set of word lattices, each represented as a weighted finite state automaton (WFSA), is constructed from training dialogs between call center agents and second parties (e.g. customers). The word lattices are assigned conditional probabilities over dialog act type. For each dialog act received from the dialog manager, the word lattices are ranked by the conditional probabilities for the dialog act type. At least one word lattice is chosen from the ranking, and is instantiated to generate a recommended agent utterance for implementing the recommended dialog act. The word lattices may be constructed by clustering agent utterances of training dialogs using context features from preceding second party utterances and grammatical dependency link features between words within agent utterances. Path variations of the word lattices may define slots or paraphrases.

20 Claims, 14 Drawing Sheets

(56) References Cited

OTHER PUBLICATIONS

Barzilay, et al., "Learning to Paraphrase: An Unsupervised Approach Using Multiple-Sequence Alignment," Proceedings of the 2003 Conference of the North American Chapter of the Association for Computational Linguistics on Human Language Technology, vol. 1, Association for Computational Linguistics, pp. 16-23 (2003).
Busemann, et al., "A flexible shallow approach to text generation." Obtained at, *arXiv preprint* cs/9812018 pp. 238-247(1998).
Carrillo, et al., "The Multiple Sequence Alignment Problem in Biology," Society for Industrial and Applied Mathematics, vol. 48, No. 5, pp. 1073-1082 (1988).
Galley, et al., "Hybrid Natural Language Generation for Spoken Dialogue Systems," Interspeech, pp. 1735-1738 (2001).
Hardoon, et al., Canonical Correlation Analysis: An Overview with Application to Learning Methods, Neural computation, vol. 16, No. 12, pp. 2639-2664 (2004).
Joshi, "Starting with Complex Primitives Pays Off: Complicate Locally, Simplify Globally," Congnitive Science, vol. 28, pp. 637-668 (2004).
Langkilde, et al., "Generation that Exploits Corpus-Based Statistical Knowledge," Langkilde, Irene, and Kevin Knight. "Generation that exploits corpus-based statistical knowledge." Proceedings of the 17th international conference on Computational linguistics-vol. 1. Association for Computational Linguistics, pp. 704-710 (1998).
Lin, et al., "Discovery of Inference Rules for Question Answering," Natural Language Engineering, vol. 7, No. 4, pp. 343-360 (2001).
McRoy, et al., "An Augmented Template-Based Approach to Text Realization," Natural Language Engineering, vol. 9, No. 4, pp. 381-420 (2003).
Narayan, et al., "DEXTOR: Reduced Effort Authoring for Template-Based Natural Language Generation," AIIDE, pp. 1-6 (2011).
Pang, et al., "Syntax-based Alignment of Multiple Translations: Extracting Paraphrases and Generating New Sentences," Proceedings of the 2003 Conference of the North American Chapter of the Association for Computational Linguistics on Human Language Technology-vol. 1, Association for Computational Linguistics, pp. 102-109 (2003).
Theune, et al., "From Data to Speech: A General Approach," Natural Language Engineering, vol. 7, No. 1, pp. 47-86 (2001).
Van Deemter, et al., "Real vs. Template-based Natural Language Generation: A False Opposition," May I Speak Freely, pp. 1-8 (2003).
White, et al., "EXEMPLARS: A Practical, Extensible Framework for Dynamic Text Generation," Proceedings of the Ninth International Workshop on Natural Language Generation (INLG) pp. 238-247 (1998).
XEROX Corporation, et al., Xerox Incremental Parser API User's Guide, Xerox Research Centre Europe (XRCE, Meylan, France), pp. 1-43 (2003-2007).

\* cited by examiner

- CLUSTER 1
    - GIVE ME A QUICK MINUTE TO LOOK THIS UP PLEASE .
    - GIVE ME 2-3 MIN PLEASE ?
    - GIVE ME 1 MINUTE WHILE I LOOK IT UP PLEASE
    - GIVE ME JUST A SEC
    - GIVE 2 - 3 MIN PLEASE
    - GIVE ME 2 - 3 MIN PLEASE
    - PLEASE ALLOW ME 2-3 MINUTES .
    - MAKE UP A DIFFERENT NAME FOR ME PLEASE
    - GIVE ME JUST A MIN
    - HANG ON FOR ME PLEASE
    - GIVE ME 2 - 5 MIN PLEASE
    - GIVE ME 2 - 4 MIN PLEASE

FIG. 4

- CLUSTER 2
    - TAP GENERAL.
    - TAP BLUETOOLH SETTINGS.
    - TAP IMPORT / EXPORT
    - TAP MENU AND THEN TAP SETTINGS.
    - TAP MANAGE APPLICATIONS.
    - THEN TAP CALL SETTINGS.
    - TAP MANAGE APPLICATIONS.
    - TAP ON MENU AND TAP SETTINGS.
    - AND PROCEED TO TAP SETTINGS.
    - TAP QUICK SETTINGS.
    - THAN TAP ON SETTINGS.
    - TAP SSPRINT HOTSPOT SETTINGS.
    - TAP SETTINGS, THEN PRIVACY
    - THEN TAP ON SETTINGS.
    - TAP WIFI SETTINGS.
    - THEN TAP ON SETTINGS.
    - TAP APPLICATIONS.
    - THEN TAP ADDRESS BOOK SETTINGS.
    - AND THEN TAP SETTINGS.
    - TAP APPLICATIONS.
    - TAP ON SETTINGS.

FIG. 5

| | |
|---|---|
| but thanks richard for the info | 165: 4 |
| gotcha thanks for the extra info | 165: 4 |
| gotcha thanks richard for the info | 165: 4 |
| thanks for the extra info | 165: 4 |
| gotcha thanks for the info | 165: 4 |
| thanks again for the info | 165: 4 |
| cool thanks for the extra info | 165: 4 |
| but thanks for the extra info | 165: 4 |
| thanks richard for the info | 165: 4 |
| hey thanks for the info | 165: 4 |
| but thanks for the info | 165: 4 |
| thanks for the info | 165: 4 |
| thanks robert for the info | 165: 4 |

FIG. 11

| | |
|---|---|
| sound settings | 18:9 |
| account settings | 18:9 |
| settings | 18:9 |
| mobile ap settings | 18:9 |
| quick settings | 18:9 |
| address book settings | 18:9 |
| reset network settings | 18:9 |
| bluetooth settings | 18:9 |
| display settings | 18:9 |

FIG. 12

| | |
|---|---|
| although | 171:1 |
| for device model | 171:1 |
| in the meantime | 171:1 |
| hello brandon | 171:1 |
| i apologize | 171:1 |
| ask away | 171:1 |
| well | 171:1 |
| i am | 171:1 |

FIG. 13 is it the same owner ?  26:1
is it the 8900 ?  26:1
is it the dialer ?  26:1
is it the htc ?  26:1
is it the internet ?  26:1
is it the <DEVICE> ?  26:1
has the quality ever been better then what it currently is ?  26:1
is it the flight ?  26:1
is it just the email ?  26:1
it is the mifi 2200 correct ?  26:1
is it the same charger ?  26:1
is it completing the update package ?  26:1
is it always the same friend ?  26:1
is it the rumor reflex ?  26:1

FIG. 14

LEARNING GENERATION TEMPLATES FROM DIALOG TRANSCRIPTS

BACKGROUND

The following relates to the customer service arts, call center operational arts, and related arts.

Call centers are common tools by which companies, governmental entities, and the like provide customer support, client support, or other assistance. Telephonic call centers are currently most common, but call centers employing other communication media are increasingly employed, such as Internet-driven text-based online chat. Besides problem diagnosis/resolution, call centers are also used for outreach—for example, telephonic product marketing and political campaigning provides tools for reaching customers and informing potential voters, respectively. In these latter applications, the call center agent initiates the call.

The staffing of call centers can be problematic. In problem diagnosis/resolution tasks, the call center is often expected to provide 24/7 response at any time of day and any day of the week, including weekends and holidays. On the other hand, the actual call load can vary widely depending upon time of day, day of week, or season or time of year. Depending upon the geographical area serviced by the call center, the call load may include multiple time zones, and service in multiple languages may be provided. In outreach tasks, call center activity may need to ramp up quickly, for example to encourage voting shortly before the day of an election.

Further, call center agents must have a multiplicity of skills, including both language/communication skills to effectively communicate and the technical skill to provide the required problem diagnosis and resolution. In the case of outreach tasks, call center agents should be knowledgeable about a product being marketed, or about a political candidate's views on issues being debated in a political campaign.

For some call centers, it may not be cost-effective, or even possible, to provide enough human call agents with the requisite communications and technical skills to fully staff the call center. A known way to address this problem is to provide a computerized call center dialog manager. Such a computerized dialog manager provides guidance for the substantive content of the call dialog. This can be open-loop, e.g. providing a dialog script that the call center agent is expected to follow. More sophisticated call center dialog managers employ feedback control by providing suggested questions for the call center agent to ask based on the dialog history.

In terms of substantive content, a computerized call center dialog manager can be effective, especially when feedback control is employed, since calls commonly follow a limited number of substantive paths. For a given product, there are a limited number of common failure modes, and each failure mode can be diagnosed and resolved using a common set of questions asked in a logical sequence. Similarly, the range of questions that a telephone marketer or political campaign outreach agent is likely to field is relatively small and can be determined, for example, by statistically analyzing a representative number of past calls handled by a skilled human call center agent.

On the other hand, the communication skills aspect of call center automation may be more challenging than the substantive content aspect. Communication skills require adept handling of natural language (spoken in the case of a telephone call, or written in the case of an online chat call), which effectively emulate the natural nuances achieved by human speakers who are fluent in the employed natural language. For example, the call center dialog manager may suggest asking the customer whether the television is plugged in (for example, based on past dialog substance indicating the television is completely nonresponsive)—but there are many ways to actually ask this question. One way: "Did you remember to plug the television into the electrical outlet?" may be interpreted by the customer as insulting, whereas another way "By the way, the television is plugged in, right?" may be interpreted as an amusing joke which nonetheless executes the desired question. Effective natural language communication also exhibits a certain spontaneity or dynamic variability that is difficult to quantify—but a human listener readily perceives, and is often annoyed by, the failure of a speaker to employ appropriate dynamic variability during a spoken or textual dialog.

One way to deal with the communication skills aspect is to employ human call center agents who are fluent in the natural language of the call, in conjunction with a computerized call center dialog manager. In this approach, the human call center agent performs the "translation" of questions suggested by the dialog manager into appropriate natural language utterances. This approach advantageously facilitates employment of call center agents who may lack the requisite technical skill (since this is provided by the computerized dialog manager), but cannot enable full automation. It still may be difficult to hire enough human call center agents with the requisite communication skills even after relaxing the technical skill requirement.

Improved efficiency can be obtained if the call center automation also provides the actual utterances to be asked, that is, the natural language "translation" of the substantive content provided by the dialog manager. In this way, completely automated call center operations can be achieved (except perhaps for the occasional complex or non-standard call, which may be transferred to a human agent). Alternatively, human call center agents may still be employed to speak the suggested utterances, with the automatically suggested utterances providing assistance to human call center agents who may not be fluent in the natural language used in a call.

BRIEF DESCRIPTION

In some illustrative embodiments disclosed herein, a call center device operates in conjunction with a telephonic or online chat communication station. The call center device comprises a dialog manager and an utterance generation component. The dialog manager is configured to determine a recommended agent dialog act based on past dialog between a call center agent and a second party which is received from the telephonic or online chat communication station. The utterance generation component is configured to generate at least one recommended agent utterance for implementing the recommended dialog act by operations including: ranking a set of word lattices each represented as a weighted finite state automaton (WFSA) by conditional probabilities p($\tau$|DA type) where $\tau$ is a word lattice and DA type is a dialog act type of the recommended dialog act; choosing at least one word lattice from the ranking; and instantiating the chosen at least one word lattice to generate the at least one recommended agent utterance. The dialog manager and utterance generation component may comprise at least one computer programmed to determine the recommended dialog act and to generate the at least one recommended agent utterance.

The call center device of the immediately preceding paragraph may further comprise a training device comprising at least one computer configured to construct the set of word lattices from training dialogs between call center agents and second parties and to assign to the word lattices τ the conditional probabilities p(τ|DA type) over dialog act types DA type. The set of word lattices may be constructed by operations including: extracting features to represent agent utterances of the training dialogs; clustering the agent utterances of the training dialogs represented by the extracted features to form agent utterance clusters; aligning the agent utterances of each cluster; and generating a word lattice represented as a WFSA encoding the aligned agent utterances of each cluster. Agent utterance features may, for example, include context features extracted from second party utterances of the training dialogs, and/or grammatical dependency link features characterizing grammatical dependencies between words within agent utterances. The generating of a word lattice may include determining weights of sub-sequences of the word lattice based on numbers of agent utterances merged to form the sub-sequences.

In the call center device of the two immediately preceding paragraphs, the training device may classify each path variation in the word lattices as a slot, a paraphrase, or neither, and during the instantiating of the chosen at least one word lattice. The utterance generation component is configured to substitute data provided by the dialog manager for any slot path variation and to choose one path of any paraphrase path variation based on weights of the paths of the paraphrase path variation.

In some embodiments disclosed herein, a non-transitory storage medium stores instructions that are readable and executable by one or more electronic data processing devices to perform a method for generating recommended agent utterances for implementing dialog acts recommended by a dialog manager of a call center. The method comprises constructing a set of word lattices each represented as a WFSA from training dialogs between call center agents and second parties, and assigning to the word lattices conditional probabilities over dialog act type. For each recommended dialog act received from the dialog manager, the set of word lattices are ranked by the conditional probabilities for the dialog act type of the recommended dialog act, at least one word lattice is chosen from the ranking, and the chosen at least one word lattice is instantiated to generate at least one recommended agent utterance for implementing the recommended dialog act.

BRIEF DESCRIPTION OF THE DRAWINGS

FIGS. 4 and 5 show some illustrative clusters obtained by actually performed instances of agent utterances clustering of the system of FIG. 1.

FIGS. 11-14 show some illustrative sets comprising lists of lexicalized paths as described herein obtained by actually performed instances of the path variations classification of the system of FIG. 1.

DETAILED DESCRIPTION

Figure 1:
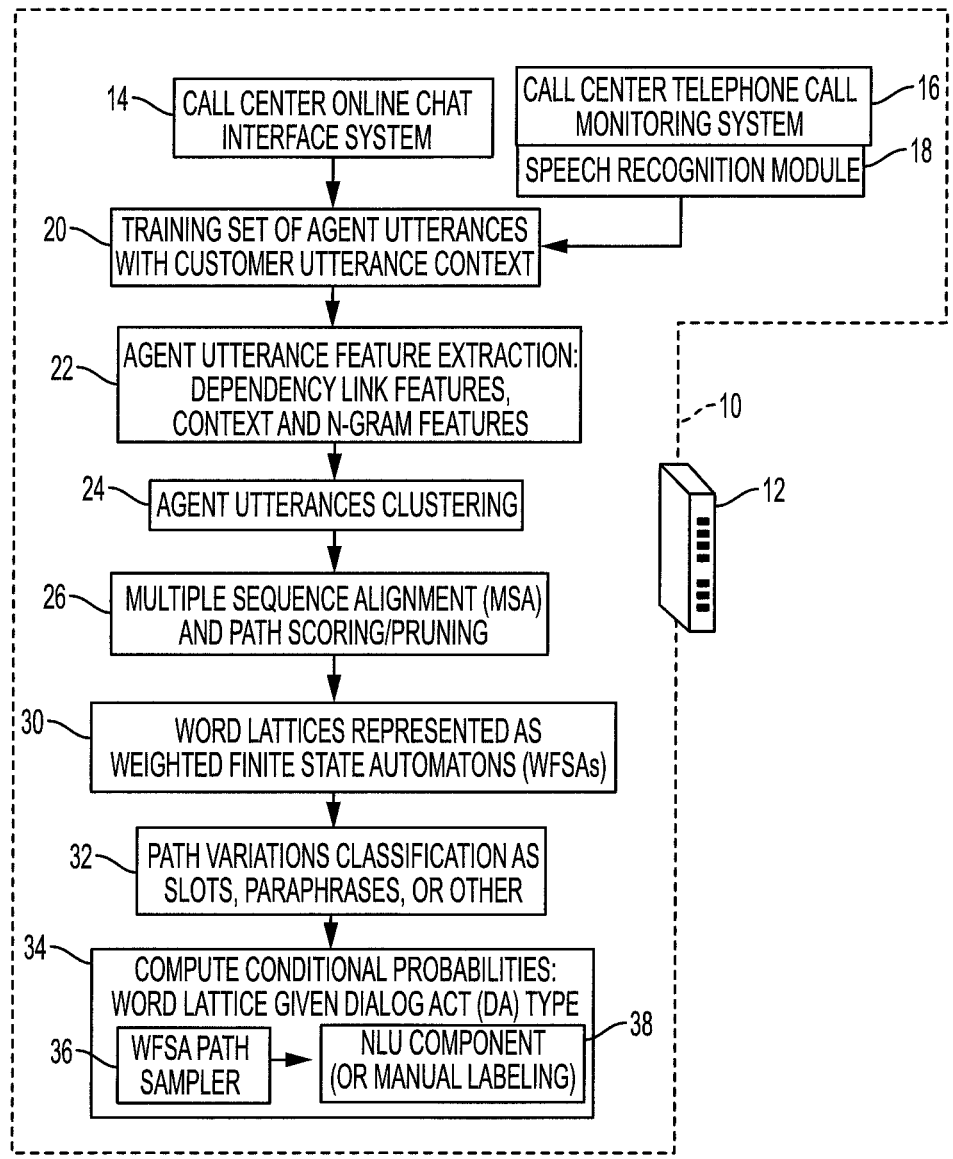
FIG. 1 diagrammatically shows a system for constructing a computerized call center utterances manager for use in conjunction with a computerized call center dialog manager.

A typical natural language generation (NLG) pipeline includes three steps: content planning; sentence planning; and surface realization. However, in a dialog scenario in which a automated call center agent interacts with a human (e.g. customer, client, potential voter, et cetera), a dialog manager (DM) takes the responsibility of planning the content to be generated given the state of the dialog. The DM communicates this information to the NLG component as content suggestions, referred to herein as dialog acts (DA). In this approach, a DA provides the substantive content to be conveyed by an utterance, including: (1) a communicative function (encoding the type of communication) also called the dialog act type (DA type) herein; and (2) content to be conveyed which is suitably obtained from a knowledge base (KB). Thus, in the call center dialog context, the NLG component is only responsible for handling sentence planning and surface realization (that is, "translation" of the content suggested by the DM into a natural language utterance that may be spoken using a speech synthesizer or by a human call center agent, or communicated as a text message in an online chat.

The NLG in the dialog scenario can effectively employ a template-based approach, since the content planning (and possibly at least part of the sentence planning) is performed by the DM. In the dialog context, the generated utterances are usually short, e.g. single sentences. So, the focus is on sentence generation rather than complete NLG pipeline for text generation. For these purposes, the template-based approach is well suited. A template-based approach is also effective because the scope of possible utterances to be generated is usually restricted to the specific domain of the dialog. The scope of utterances include greeting the customer, providing/requesting information, instructing the customer, or asking for clarifications among a few other things.

In executing the dialog, the call center agent should sound natural to the customer or client. In constructing a sentence ab initio, even using a sophisticated grammar-based sentence building approach, it is difficult to simulate the subtle aspects of natural human speech, such as the apparently random usage of different paraphrases or synonyms with subtly different shades of meaning. By contrast, template-based approaches disclosed herein capture such language complexity within the template itself, using a conditional probabilistic framework, in order to achieve natural sounding utterances.

In approaches disclosed herein, templates are automatically learned from past dialog training data. Flat templates can be learned from past dialog training data more effectively than a generation grammar. The templates are encoded as weighted finite state automaton (WFSA) structures, which are sometimes referred to herein by the shorthand of a finite state automaton (FSA). These structures enable the capturing of many natural language variations within a single template, as well as enabling the interaction of a template with other templates using the standard FSA operations to generate complex utterances beyond single sentences.

With reference to FIG. 1, a training system 10 for constructing the word lattices (represented as WFSAs) and assigning probabilities to them is described. This is a computationally intensive task, and is preferably carried out using a substantial computing resource such as an illustrative server computer 12. While a single illustrative server 12 is shown (which may in general be a single-core computer or a multi-core computer), the computing resource used to perform the training may comprise a plurality of such computers (e.g. servers, desktop computers, notebook computers, or so forth) operatively interconnected as a computing cluster, cloud computing resource, parallel computing system, or so forth. The training operates on training data, which may in some embodiments be obtained from a call center online chat interface system 14. Advantageously, online chat call center agents communicate with customers or clients (more generally, a dialog between an automated or human call center agent and a second party, e.g. customer, client or so forth) using a text-based chat interface in which utterances by the agent directed to the customer/client and utterances by the customer/client directed to the agent are in text format. In this case, the training data are directly obtained as these natively text dialogs. Additionally or alternatively, training data may be obtained from a telephonic call center. In this case, the utterances are telephonic communications (generally, a dialog between an automated or human call center agent and a second party, e.g. customer, client or so forth) which are suitably monitored by a call center telephone call monitoring system 16. Such monitoring should be done using best practices to avoid unauthorized or illegal eavesdropping, e.g. by providing an initial automated message informing the caller that the call may be monitored to improve customer service. A speech recognition module 18 transcribes the recorded audio utterances into text dialog, i.e. text utterances. In general, a training set 20 of dialog, i.e. agent utterances with customer utterance context, is collected. It is contemplated for this training set to include a mixture of dialog obtained from both online chat and telephonic call center communications; however, since people tend to speak differently than they write (or type), it may be preferable to employ training data collected from a single communication modality (online chat or telephonic).

Figure 3:
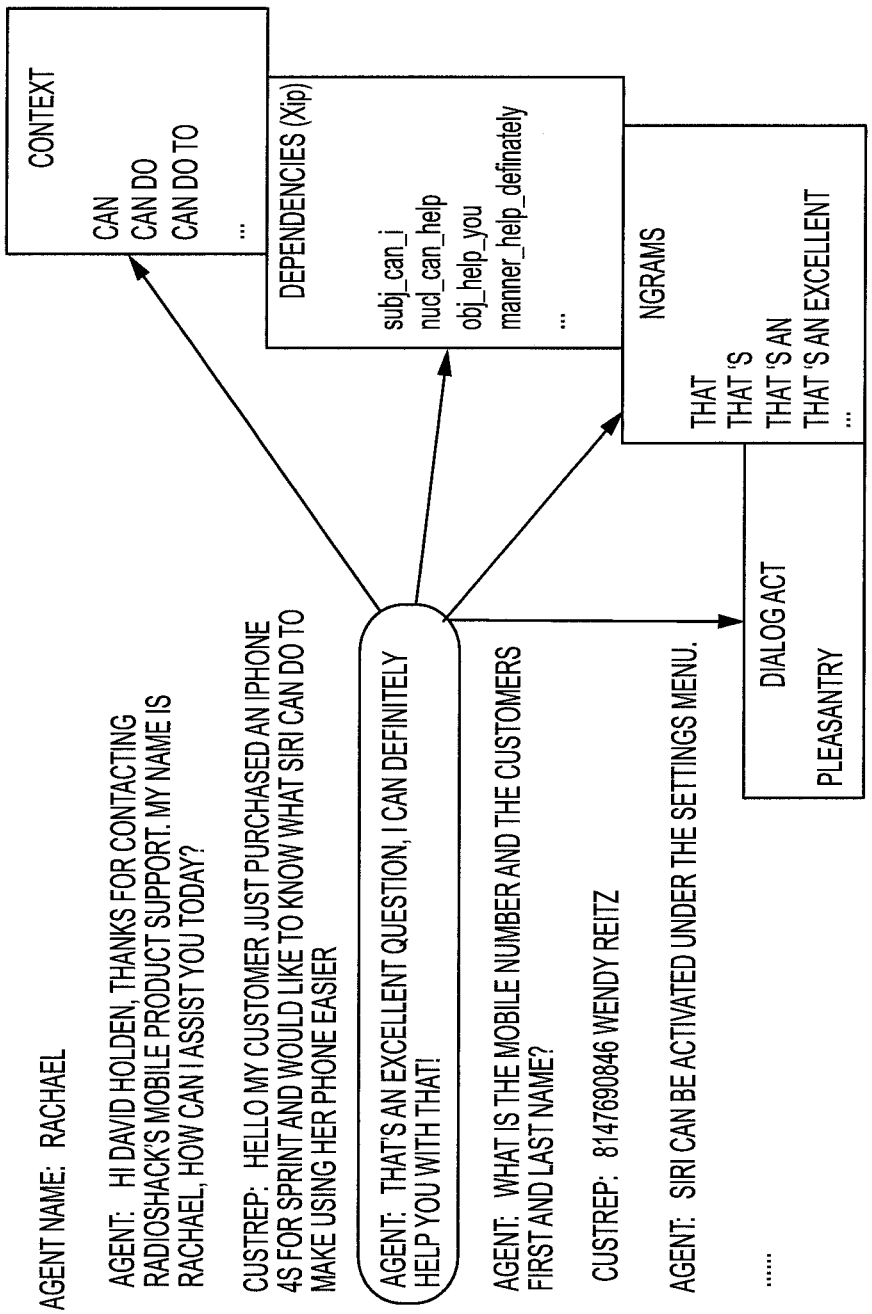
FIG. 3 diagrammatically shows some suitable features that may be extracted from and used to represent an agent utterance.

With continuing reference to FIG. 1 and with brief reference to FIG. 3, agent utterances are characterized by suitable features in feature extraction 22. Some suitable features are illustrated in FIG. 3, and may include n-gram features characterizing the content of the utterance, dialog-based features such as context of the call center agent's utterance, and dependency features (i.e. dependency links providing grammatical relationships between words). Additional or other features are contemplated. In some approaches, features may be added during the training process in a feedback-type approach, e.g. if an agent utterance is categorized (perhaps tentatively) as a particular dialog act type (DA type) then this may be assigned as a further feature of the agent utterance. In some embodiments, the Xerox Incremental Parser (XIP) is used to extract such features. See e.g. *Xerox Incremental Parser API User's Guide*, Xerox Research Centre Europe (XRCE, Meylan, France), © 2003-2007 Xerox Corporation. More generally, the XIP is used in illustrative embodiments herein for natural language parsing, part-of-speech labeling, and linguistic information extraction tasks generally, but this is merely an illustrative example.

Agent utterances are typically sentences, although utterances of other types of grammatical units are contemplated (for example, short utterances that are not grammatically correct sentences, or an utterance including two linked sentences such as "So the television is plugged in. Are you sure the electrical outlet is active?"). Since the goal of the utterance generation component (see FIG. 2) that is undergoing training is to propose agent utterances, the client/customer utterances of the dialog are not directly part of the training data set and are not represented by feature vectors. However, as disclosed herein client/customer (more generally, "second party") utterances of the dialog are optionally leveraged to construct context features for the agent utterances.

With continuing reference to FIG. 1, agent utterances clustering 24 is performed on the training data set 20 (represented by the features output by the features extraction 22) to group agent utterances of the training set into cohesive groups. The clustering 24 operates to group agent utterances that are cohesive in terms of the DA types as well as their surface structure. Having cohesive DA types enhances accuracy of the mapping from DA types to texts. The subsequent induction of word lattices relies on surface-level similarity of the texts, and hence the aim is also to obtain clusters with this criterion as well.

The induction 26 of word lattices from clusters is performed using multiple sequence alignment (MSA) followed by path scoring and pruning. MSA is an alignment technique commonly used to align genetic sequence read fragments and other bioinformatic sequence fragments. A WFSA is constructed based on these alignments, with paths through the WFSA scored according to how well they align with other paths, and paths with low scores are pruned. The output of the induction 26 is word lattices 30 represented as WFSAs. Path variations classification 32 is then performed on the word lattices 30. The aim of the classification 32 is to identify path variations in the word lattice that correspond to slots, and to identify path variations that correspond to paraphrases (or synonyms for single-word variations). Slots are path variations that will be filled in with (i.e. substituted by) external information provided by a dialog manager. For example, in the utterances "Your television screen size is fifty-five inches" and "Your television screen size is sixty inches", the difference "fifty-five" and "sixty" are path variations corresponding to slots, since the DA type is to inform the customer/client of the screen size and the particular value "fifty-five" or "sixty" is the slot entry that is filled in from a knowledge base of the dialog manager in constructing a specific utterance recommendation. In general, some slots may be linked to knowledge base concepts, while other slots may have a constrained set of possible fill-in values. The slots labels are incorporated into the word lattices to obtain the utterance generation patterns. This makes the FSA less dense and cleaner for the next step.

In computation 34, conditional probabilities for the word lattice (represented as a WFSA) are computed for given DA types. These probabilities are written herein as $p(\tau|DA\ type)$ where $\tau$ is the word lattice/WFSA. In illustrative examples herein, the computation 34 generates the conditional probabilities modelled as a probabilistic transduction operation from the dialog act types (DA type) to the generation patterns ($\tau$), and subsequently to utterances by filling in any slots and performing optional re-ranking based on fluency metrics or the like. To learn this transducer corresponding to the WFSA produced in the earlier steps, a Natural Language Understanding component may be employed to annotate a sample of utterances consumed by the WFSA. From that annotated sampling, the probability given a dialog act type, i.e. $p(\tau|DA\ type)$, is computed. In effect, a WFSA is obtained that maps from dialog act types (DA type) to generation patterns ($\tau$). In the illustrative approach, a WFSA paths sampler 36 generates sample utterances for a word lattice, and these sample utterances are classified by a Natural Language Understanding (NLU) component (or by manual labeling) 38. The statistics $p(DA\ type|utt)$ for the sample utterances of word lattice $\tau$ are then used to generate the probabilities $p(\tau|DA\ type)$ for that word lattice, for example using Bayes' rule.

Figure 2:
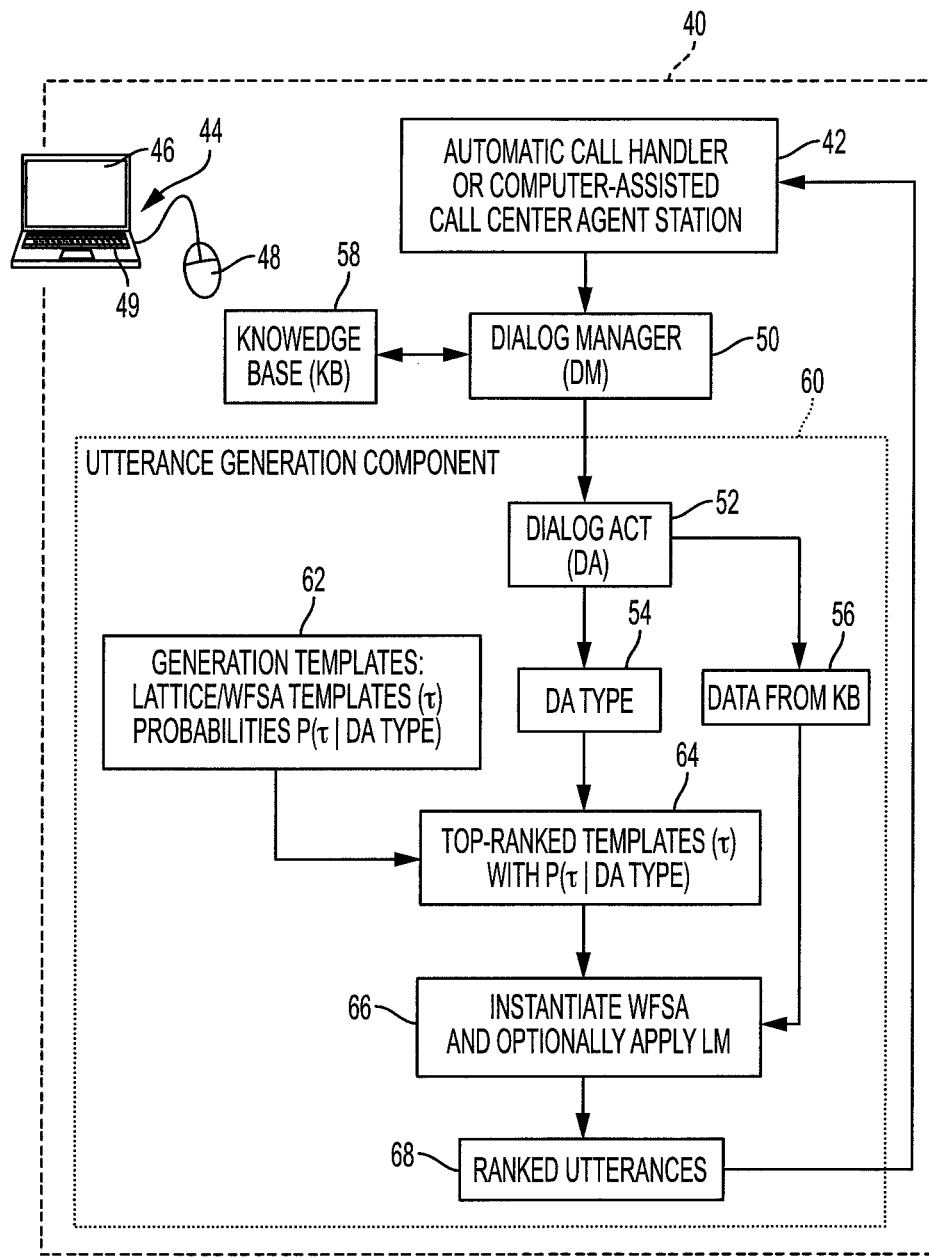
FIG. 2 diagrammatically shows an automated call center system, or semi-automated call center support system, employing a computerized call center utterances manager constructed using the system of FIG. 1 operating in conjunction with a computerized call center dialog manager.

With reference now to FIG. 2, the word lattices $\tau$ (represented as WFSAs) and associated conditional probabilities $p(\tau|DA\ type)$ are used in a call center 40 to support an automatic call handler or computer-assisted call center agent station 42. The automatic call handler or computer-assisted call center agent station 42 executes, or assists in executing, a dialog between a computerized or human call center agent and a second party such as a customer or client. In the case of an automatic call handler, a computer such as the illustrative server 12 (see FIG. 1) performing the training phase may be used, alone in the case of online chat communication or in conjunction with a suitable microphone/speech synthesizer in the case of telephonic communication. In the case of a computer-assisted call center agent station, a computer 44 with suitable user interfacing components, e.g. a display 46 and a mouse 48, keyboard 49, or other user interface devices is suitably employed.

A dialog manager 50 receives utterances from the customer or client via the call handler or agent station 42. For example, these customer/client utterances may be text utterances in the case of an online chat modality, or spoken utterances transcribed into text utterances by the speech recognition module 18 (FIG. 1) or the like in the case of a telephonic modality. The dialog manager 50 can be any system that operates to convert customer/client utterances to semantic representations and process those semantic representations to generate an agent dialog act (DA) 52 representing a suitable semantic-level response to the customer/client utterance. In one approach, the DM 50 employs a branching dialog script and state variables whose values are obtained from the dialog history or other sources (e.g. an electronic customer record). In general, some (perhaps many or all) state variables have no values initially, and values for state variables are obtained by following the dialog script. At a branch point of the dialog script, the next question is decided based on the (now) available values of the state variables. The dialog script may also include branches to address common questions that may be posed by the customer or client. In a variant topic dialog management framework, topic scripts are defined for different topics and the appropriate topic script is followed based on the dialog history to date. This topic variant can more naturally follow the flow of conversation of the dialog. Dialog manager implementations that do not rely on pre-determined scripts are also contemplated, for example choosing the next dialog act 52 based on an algorithm operating on the current state variable values and on which state variables do not yet have available values.

In general, the DA 52 is a recommended semantic-level action (e.g. question or response) to be taken by the call center agent, to then be converted to a natural language utterance that can be conveyed to the second party (e.g. customer or client) via the call modality (e.g. online chat or telephonic). The recommended agent DA 52 can be decomposed into a dialog act type (DA type) 54 and possibly additional data 56 obtained from a knowledge base 58. For example, the DA 52 could be expressed as "TELL (screensize=sixty)" where in this illustrative example the DA type 54 is "TELL(screensize)" and the additional data 56 is sixty (the actual screen size of the customer's television). In another example, the characteristic itself may be additional data for the dialog act type, e.g. the DA type might be "TELL(product·characteristic=value)" where in this example the additional data further includes product·characteristic=screensize. These are merely illustrative examples.

The DA 52, including its constituent DA type 54 and any additional data 56, serves as input to an utterance generation component 60 that applies generation templates 62. The generation templates 62 include the word lattices (represented as WFSAs) and associated conditional probabilities $p(\tau|DA\ type)$ generated by the training system 10 of FIG. 1. The conditional probabilities $p(\tau|DA\ type)$ are applied to rank the relevance of each word lattice $\tau$ to the DA type 54 called for by the dialog manager 50, and the top-ranked (i.e. most relevant, or most probable) word lattices 64 are identified. These are instantiated 66 with any slots filled in by the additional data 56 of the DA 52 to generate ranked utterances 68. Optionally, the instantiated utterances are re-ranked using a language model (LM) to provide an additional fluency re-ranking of the instantiated utterances. The ranked utterances 68 are returned to the call handler or agent station 42. In the case of an automatic call handler, the top-ranked utterance is typically returned and executed (e.g. sent as text to the customer/client in the case of online chat, or telephonically communicated via speech synthesis in the case of a telephonic call modality). In the case of an agent station, the top-ranked utterances are presented as suggested responses to the (human) call agent via the display 46.

In the following, illustrative embodiments of various components of the training and call center systems 10, 40 are described.

The goal of the feature extraction 22 and clustering 24 is to cluster on all the training agent utterances 20 such that sentences in each cluster can be used to get a template. Some suitable criteria for obtaining these clusters include: cohesiveness of dialog act (DA), and surface-level similarity.

Cohesiveness of the DA is addressed in some illustrative embodiments as follows. It is desired that each learned word lattice maps to a particular dialog act (or, more precisely, dialog act type) with good precision. The goal is therefore to obtain clusters that are as cohesive as possible in terms of dialog act, which means that the communicative function (inform, ask, etc.) and the content (devices, carriers, etc.) need to (approximately) match. In order to generate such clusters, two types of cohesiveness-oriented features that may be suitably used are grammatical dependency links and customer/client context. Grammatical dependency links provide grammatical relationships between words within agent utterances, thereby giving hints about both the structure of the sentence (helpful for communicative function), and some relationships that indicate the content. Similarly, an utterance by a customer generates an expectation of the type of response by the agent. For example, if a customer asked a question, the response would less likely be another question. Additionally, if the customer has asked a question about a device, it is expected that the call center agent's utterance would contain some information about the device as well.

For the customer context features, n-grams from the customer's utterance may be used.

These two types of features (dependency links and customer/client context) are richer than bag-of-words features in terms of semantic content, and are well-suited for clustering agent's sentences into cohesive dialog acts. In order to generalize on these two classes of cohesiveness-oriented features, dimensionality reduction is optionally applied on each of them independently and then these feature sets are combined before doing the clustering. In one such approach, each of the features is weighted with term frequency-inverse document frequency (tf-idf) scores, and then latent semantic analysis (LSA) is applied for dimensionality reduction, e.g. to 100 dimensions each, after which the two reduced feature sets are weighted using a hyper-parameter and concatenated. In another suitable approach, one can model it as a problem of multi-view learning and apply Canonical Correlation Analysis (CCA) on these two feature sets in order to obtain a feature representation that can be used for clustering.

The word lattice induction also should provide strings that have good surface-level similarity (in addition to semantic similarity). One suitable approach for providing surface-level similarity features is to use n-gram features of a high order (up to 7, or possibly even higher). Typically, it is fair to assume that good surface-level similarity also means a good semantic similarity but is neater to make this division conceptually. Here, LSA is not used in order to concentrate on surface aspects.

With reference to FIG. 3, a sample call center agent utterance from a training set, namely the utterance "That's an excellent question, I can definitely help you with that!" is illustrated in its dialog context, with the above-discussed features for this utterance indicated. In this instance, the context features include, for example, "can", "can do", "can do to", which are n-grams of n=1, n=2, n=3 respectively taken from the immediately preceding utterance of the customer (or customer representative in this illustration). The illustrative dependencies features are grammatical features extracted using the Xerox Incremental Parser (XIP). The n-gram features are extracted from the agent's utterance, e.g. "that", "that's", "that's an", "that's an excellent", or so forth.

As further illustrated in FIG. 3, the utterance may also be assigned a dialog act (DA) feature—however, this feature may be tentative, e.g. assigned after an initial pass of the clustering 24 followed by tentative labeling of groups with DA features.

Various clustering algorithms and approaches can be employed for the clustering 24, such as single stage or two-stage clustering. In some demonstrative examples, a single stage strategy was employed using only the surface-level similarity features. In some other demonstrative examples, a two-stage strategy was employed with the first stage using the cohesiveness-oriented features, and then performing sub-clustering using the surface-level features. For the cohesiveness-based grouping, a sentences-per-cluster ratio of 500 was used, while for surface-level similarity based grouping a sentence-per-cluster ratio of 20 was used. The demonstrative examples were performed using k-means clustering where the number of clusters is determined by the sentences-per-cluster-ratio.

With reference to FIGS. 4 and 5, the demonstrative single-stage clustering output clusters including the two clusters shown in FIGS. 4 and 5.

The utterances of a cluster are preferably labeled as to the DA type, and it is desired that a cluster contain mostly (or entirely) utterances of a single DA type. A metric called "purity" may be used to measure this. For the purity metric, each data point in every cluster is labeled, and the label of the majority of the data points in a cluster is considered as the label of the cluster. That is, the purity of the cluster is computed as:

$$\text{purity}(\omega, C) = \frac{1}{N} \sum_k \max_j |\omega_k \cap c_j| \quad (1)$$

where $\phi = \omega_1, \omega_2, \ldots, \omega_K$ is the set of clusters, and $C = c_1, c_2, \ldots, c_J$ is the set of classes. In Expression (1) the notation $|\omega_k \cap c_j|$ represents the number of data points in cluster $\omega_k$ which are of label $c_j$, and N represents the total number of data points.

For labeling the data points, a baseline Natural Language Understanding (NLU) component may be used, which generates utterances in the cluster with dialog acts. Using a NLU component for computing this metric is not ideal. However, it can still be used to compare various clustering algorithms. As an initial result, baseline purity computed for the clusters obtained using the demonstration one-stage clustering with only surface-level features is 0.69373.

Next, illustrative examples of the word lattice induction 26 of the training of FIG. 1 to generate the word lattices 30 are described. The utterances in each cluster are aligned. In an illustrative approach, Multiple Sequence Alignment (MSA), a popular method to align protein sequences in bioinformatics, was used. Analogously, utterances correspond to the sequences and words correspond to amino acid letters. Then, the aligned subsequences of these sentences are merged to form the word lattice. The weights of these sub-sequences are set based on the number of utterances merged at that subsequence. Hence, the subsequences that have alignments across many utterances have a greater chances of being part of the canonical path (i.e. representative sequence) across the word lattice. The words that are not candidates for alignment (e.g., occur in only one or a few training utterances) are weighted in two different ways. In a mild pruning scenario, they have a neutral weight of 0. In a (more) strict pruning scenario, they are penalized, and this enables longer sequences to be penalized in the lattice.

The word lattice is pruned to remove those paths that are beyond a threshold weight compared to the canonical path (the path with the highest weight or the lowest cost). For example, a threshold of 5 implies that all paths that have at least five differences with the merged parts of highest weighted path are removed. This still permits all the path variations which do not vary much with respect to the merged portions.

Figure 6:
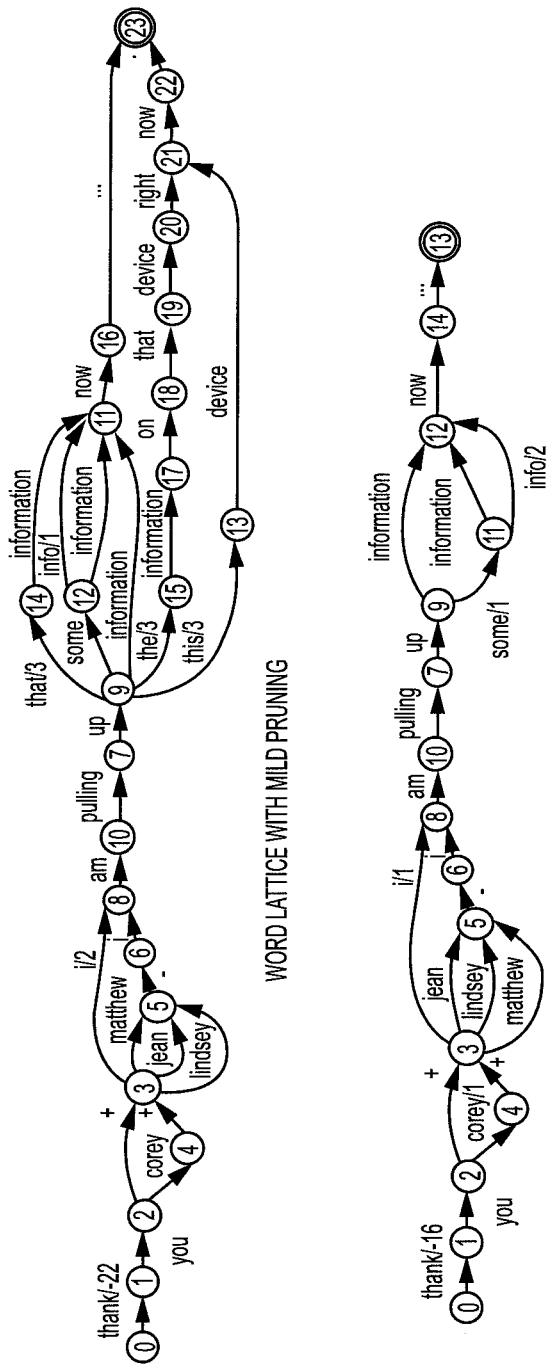
FIG. 6 show an illustrative example of mild versus strict pruning of a word lattice as described herein.

With reference to illustrative FIG. 6, mild pruning produces lattices that are denser compared to the ones produced by strict pruning, since fewer paths are pruned out with mild pruning. In the illustrative example of FIG. 6, the canonical path corresponds to the sentence "Thank you, I am pulling up information now." Pruning facilitates generating word lattices anchored around the canonical paths, and thus also removes noisy paths that were generated because of errors in the clustering 24 or alignment.

Next, illustrative examples of the path variations classification 32 of the training of FIG. 1 are described. The goal of the path variations classification 32 is to identify path variations in the word lattice that correspond to slots that are filled with information available from the dialog manager 50 (see FIG. 2). Additionally, path variations corresponding to paraphrases (or synonyms in the case of single-word variations) are identified. These provide alternative texts that can be used interchangeably so that the generated call center agent utterances are more natural (as they better reflect the spontaneous variability of human utterances).

Figure 7:
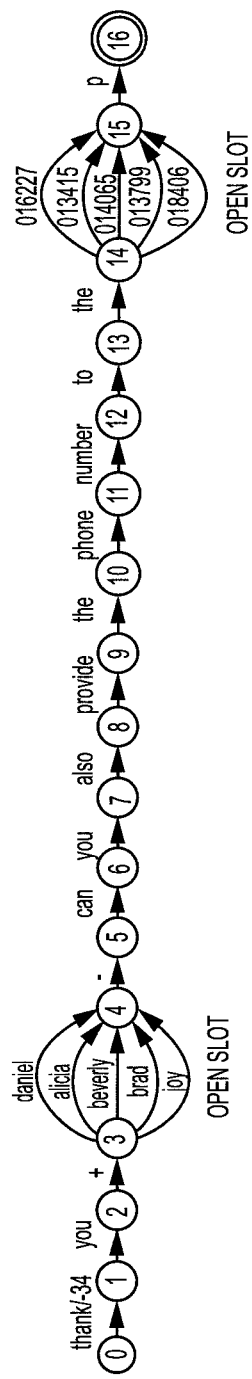
FIGS. 7-10 present illustrative word lattices demonstrating some illustrative types of path variations as described herein.
Figure 8:
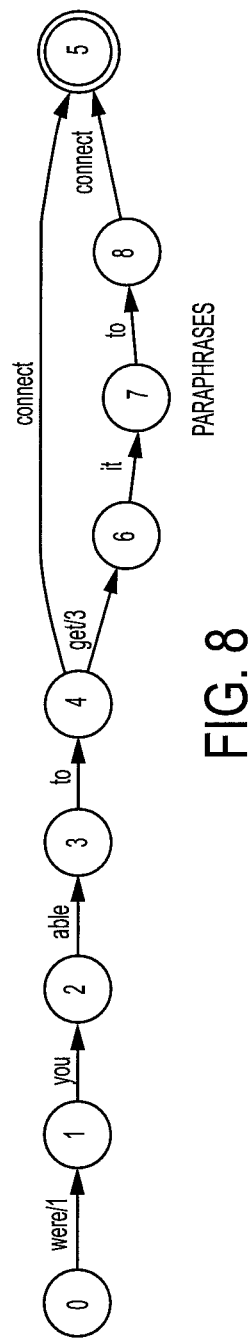
Figure 9:
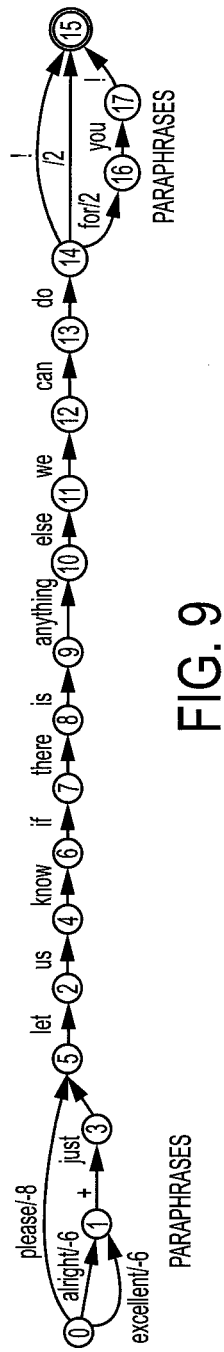

With reference to FIGS. 7, 8, and 9, some illustrative path variations of the slot and paraphrase classifications are shown. The examples of FIGS. 7-9 were strictly pruned.

The word lattice of FIG. 7 contains path variations corresponding to "open" slots that can be filled with an open set of values. For example, the first open slot can be filled with a NAME, while the second open slot can be filled with a valid STORE NUMBER. These values are provided during dialog support (FIG. 2) by the knowledge database 58, and the grounding link between the database 58 type and the slot can be made based on the alignment between the values that these take. It is contemplated for a particular path variation to correspond to more than one open slot. Alternatively, "closed" slots may be classified that take only a limited set of values, and might correspond to grammatical functions such as discourse markers, adjectives, conjunctions etc. Closed slot values can also be filled based on information provided by the dialog manager 50 during dialog support.

The word lattices of FIGS. 8 and 9 contain path variations corresponding to paraphrases. These paraphrase variations are useful in the template in order to represent variations to the canonical path. Such paths are classified differently from slots because paraphrase variations do not reflect difference in the semantic content of the dialog act, but only different choice of realization for the same semantic content. The term "paraphrase" is used loosely herein, and encompasses single-word synonyms (i.e. a paraphrase consisting of a single token is a synonym) and alternative paths that are not strictly semantically equivalent. FIG. 9 shows an example of such a "not strictly equivalent" paraphrase, where the alternatives "please", "alright, just", and "excellent just" are not semantically equivalent, but are substitutable phrases that are considered as paraphrases in this context.

Figure 10:
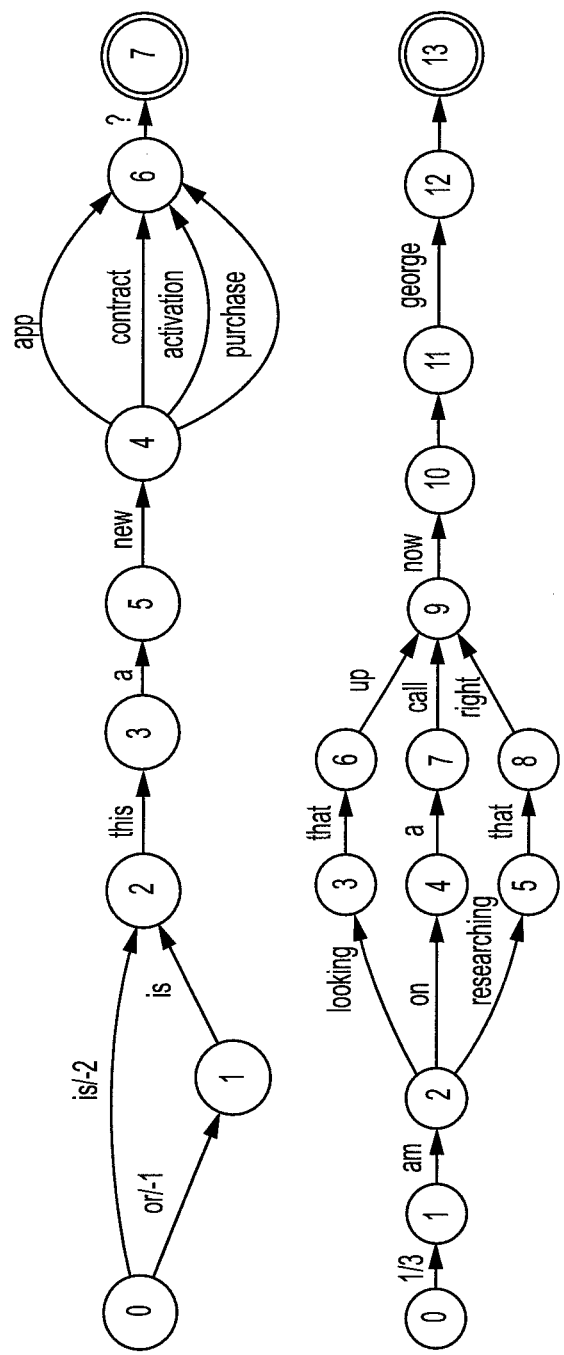

With reference to FIG. 10, in one illustrative approach, to extract variation candidates for classification, each word lattice is processed in the following way. For each word lattice all overlapping paths are identified: these are paths between a pair of nodes for which there is more than one lexicalization option. This could be: (i) different paths between the same source and destination nodes, e.g., paths {2,5,8,9} and {2,3,6,9} in the lower word lattice of FIG. 10; or (ii) a single-transition path with multiple alternatives, e.g. path {4,6} in the upper word lattice of FIG. 10. The output of this step are sets of lexicalized paths. Overlapping paths are extracted by finding all source nodes (with more than one outgoing edge) and all destination nodes (with more than incoming edge) in the graph, and then finding all possible paths between each pair of nodes, through depth-first-search. All paths with the corresponding edge values (the words) are lexicalized. The graph edges are encoded such that single-transition paths generate all possibilities in this step. To avoid exponential explosion of possible paths, a cap may be placed on the number of possible source-destination pairs (e.g., a cap of 50 in some demonstration examples). All entities in the lexicalized paths are optionally marked with entity tags. The output of the above steps comprises a list of sets, each one containing a list of lexicalized paths.

FIGS. 11, 12, 13, and 14 present four examples of (parts of) such sets obtained in demonstration examples of these steps. In FIGS. 11-14, the numbers following the text indicate the group number and consist of the word lattice number and the group of overlapping paths within this word lattice. As seen in the examples of FIGS. 11-14, from overlapping paths paraphrases (FIG. 11) or slots (FIG. 12) may be extracted. Sometimes, however, the overlapping paths are of mixed classes or are simply noisy (FIGS. 13 and 14). Thus, the overlapping paths should be further classified into their corresponding types. To do so, a co-occurrence graph of lexicalized paths is constructed, indicating which texts occur with each other multiple times. This is an iterative process that may include some manual labeling between each iteration.

Figure 15:
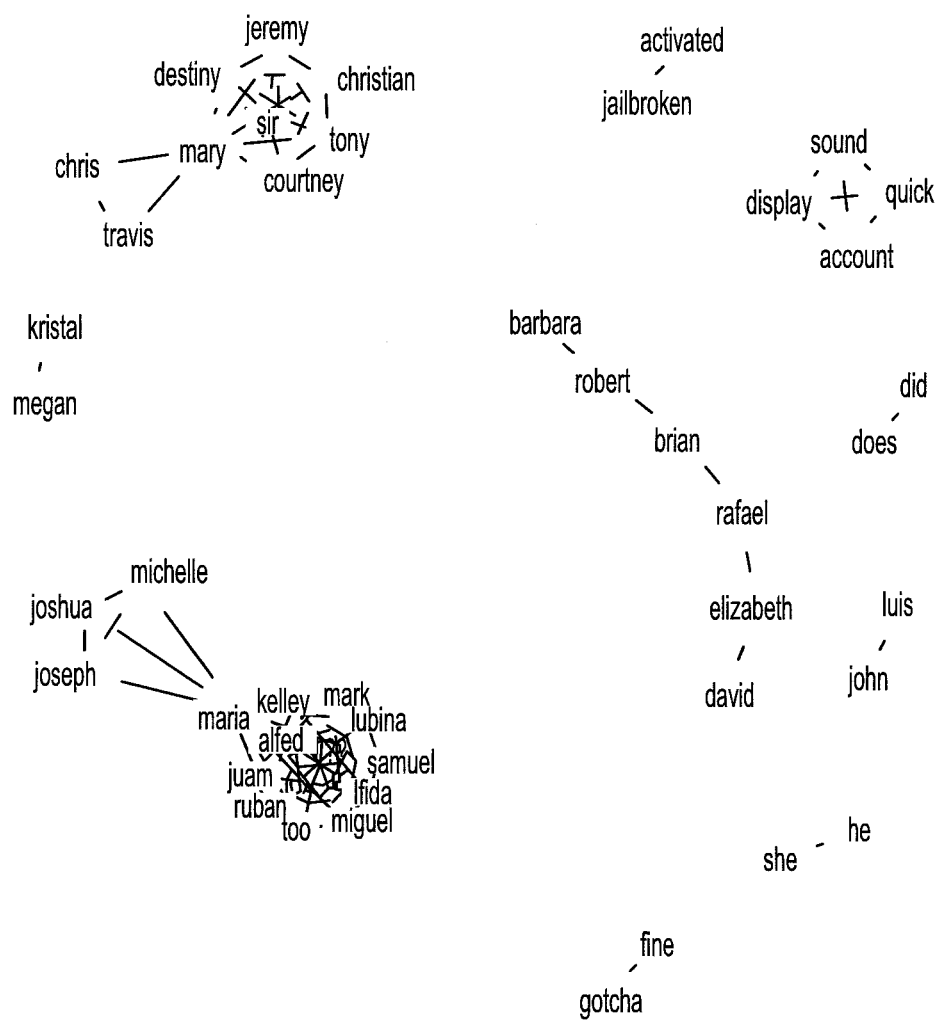
FIGS. 15 and 16A and 16B show some illustrative co-occurrence graphs as described herein obtained by actually performed instances of the path variations classification of the system of FIG. 1.

FIG. 15 shows the co-occurrence graph created at the first step. Each node of the graph represents a text (a lexicalized path); edges between texts are added if: (i) the number of different groups in which both texts occur exceeds a threshold; (ii) the Jaccard coefficient of their occurrence exceeds another threshold. The Jaccard coefficient is computed as the ratio of the number of groups in which the texts co-occur and the total number of groups in which they occur, i.e.:

$$J(t_1, t_2) = \frac{|\mathcal{G}(t_1) \cap \mathcal{G}(t_2)|}{|\mathcal{G}(t_1) \cup \mathcal{G}(t_2)|} \qquad (2)$$

where $t_i$ is texts and $\mathcal{G}(t_i)$ is the set of groups in which text $t_i$ occurs. The Jaccard coefficient operates to avoid favoring frequent texts. The illustrative graph shown in FIG. 15 was created for single-token lexicalized paths, with a co-occurrence threshold of 3 and a Jaccard threshold of 0:25. This graph contains several components, where some correspond to open slots, such as names, and some to paraphrases (such as "gotcha" and "fine"). Each such group is presented to a user who can label it with a tag (such as NAME), specify that the group refers to paraphrases (the above example is labeled as P1) or not label it at all (e.g., if it is mixed or noisy, as in FIGS. 13 and 14). The manual labeling is then used to tag all the texts with the new tags and the process is repeated, this time with longer text segments.

Figure 16A:
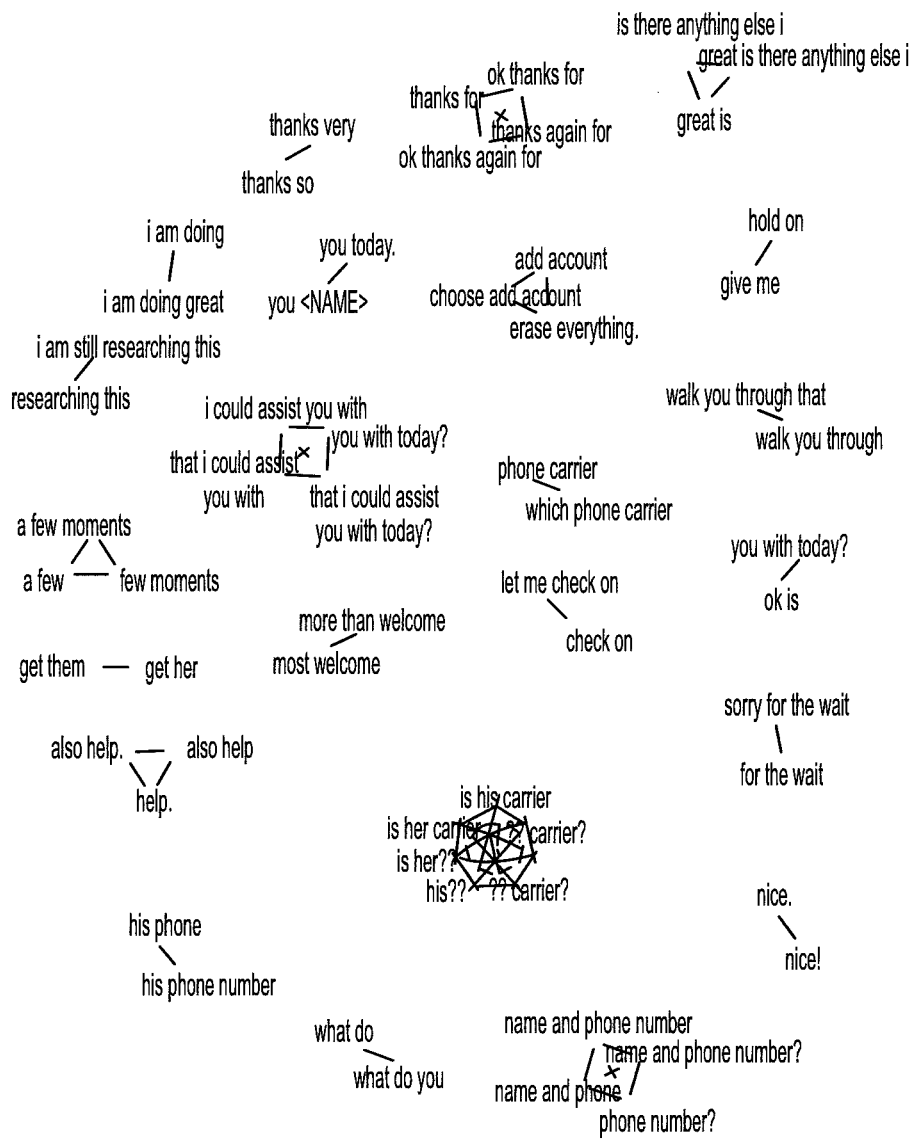
Figure 16:

FIGS. 16A, and 16B shows an example of a co occurrence graph created using texts of up to 5 tokens, with a co occurrence threshold of 24 and a Jaccard threshold of 1. Some of the paraphrases identified in the graph of FIG. 16A, include the following examples. The paraphrases "you today.", "you <NAME>" can be used, for example, following "How can I assist" or "How are". Another example paraphrase identified in the graph of FIG. 16A, is "thanks very", "thanks so". Another example paraphrase identified in the graph of FIG. 16B is "cool thanks", "hey thanks", "<P1> thanks". In this example, P1 is the label given in the previous step to the paragraph group {"fine","gotcha"}. Another example paraphrase identified in the graph of FIG. 16A is "more than welcome", "most welcome". Other groups refer to slots, e.g. "2-3", "2-4" (originating from: "give me 2-3 minutes"), and others are noisy (e.g. like FIGS. 13 and 14). Once labeled, processing can proceed to the next iteration. When enough data are collected, the manual labeling can be used for training a supervised classifier.

Next, illustrative examples of the conditional probabilities mapping 34 of word lattices (represented as WFSA's) to dialog act types (DA types) of the training of FIG. 1 are described. The goal is to have a ranked list of WFSA's associated with each DA type. To generate such a ranked list, each WFSA (τ) is associated with a distribution over DA types. This is suitably done by sampling 36 various paths from the WFSA and then tagging them using a Natural Language Understanding (NLU) component. The NLU component 38 can employ any suitable algorithm for computing probabilities p(DA type|utt) which are the conditional probabilities of dialog act type (DA type) for a given (sample) utterance (utt). The NLU component 38 typically includes a lexicon with ontology and a parser employing a suitable natural language grammar, and employs a semantic theory along with the ontology to quantitatively estimate the probability of the DA type that a given sample utterance implements. Rather than, or in addition to, employing an automated NLU component, the sample utterances may be manually labeled by a trained human call center agent or the like as to DA type. Manual labeling is feasible because the number of word lattices should be relatively small and the clustering 24 produces cohesive clusters so that only a few sample utterances for each word lattice should be sufficient to estimate the probabilities p(DA type|utt) for all dialog act types.

The probabilities associated with these decisions are then aggregated to obtain the probabilities of various DA types for the entire WFSA. However, the objective is to obtain a distribution over WFSA's given the logical form. To compute this, Baye's rule can be applied aggregating information over all the WFSA's according to:

$$p(\tau \mid DA \text{ type}) \propto \sum_{utt} p(\tau \mid utt) \cdot p(utt \mid DA \text{ type}) \quad (3)$$

$$\propto \sum_{utt} p(\tau \mid utt) \cdot p(DA \text{ type} \mid utt) \cdot p(utt)$$

where $\tau$ is a WFSA, DA type is a dialog act type, p($\tau$|utt)=0/1, p(utt) represents the probability of seeing an utterance in the dialog transcript, and P(DA type|utt) is the probability of a dialog act type given an utterance which is provided by the Natural Language Understanding component.

Figure 17:
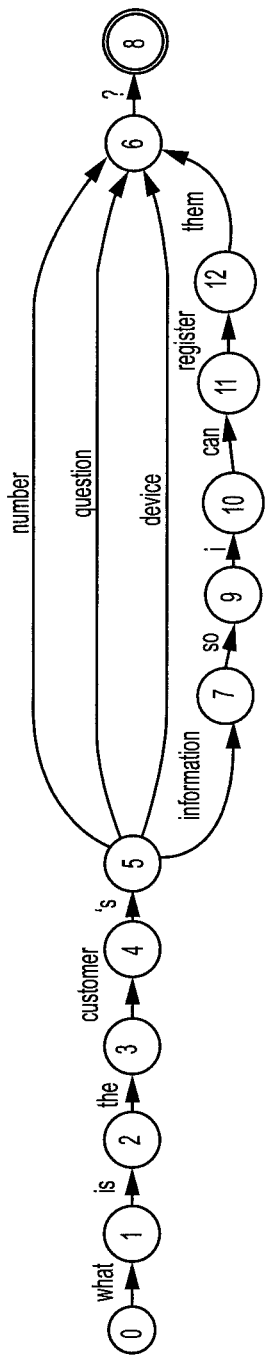
FIGS. 17 and 18 illustrate word lattices returned by conditional probabilities mapping of word lattices to dialog act types output by the system of FIG. 1 as described herein.
Figure 18:
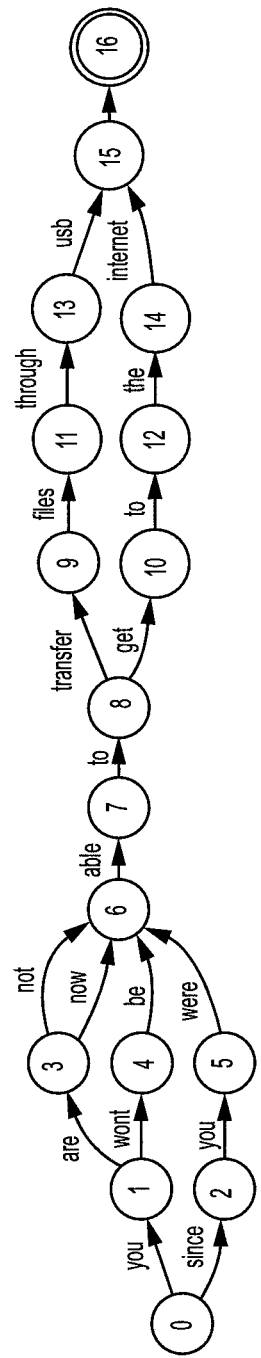

FIGS. 17 and 18 show demonstration results of the entire pipeline. Given the DA type Ask.SpecParameter, FIG. 17 contains the top-ranked WFSA based on the probability computed using Expression (3). Given the DA type Inform.ProblemIs, FIG. 18 contains the third-highest-ranked WFSA. These results do not incorporate the generalization and pruning 26.

The call center device of FIG. 2 can utilize the generation templates 62 in various ways. In general, the dialog act (DA) 52 is recommended by the dialog manager (DM) 50 based on past dialog between the call center agent and the second party (e.g. customer or client). This dialog is received by the DM 50 from the telephonic or online chat communication station 42 (employing suitable speech recognition transcription in the case of telephonic dialog). At the utterance generation component 60, the word lattices $\tau$ are ranked 64 by DA type-conditional probabilities p($\tau$|DA type) where DA type is the dialog act type 54 of the DA 52 received by the utterance generation component 60 from the DM 50. One or more top-ranked word lattices are chosen, and the chosen word lattice(s) instantiated by traversing the WFSA representing the chosen word lattice and substituting data provided to the utterance generation component 60 by the dialog manager 50 for any path variation of the WFSA identified as a slot. Optionally, the resulting instantiated utterances are re-ranked based on further ranking criteria, such as a language model (LM) providing a fluency metric.

In the case of an automatic call center agent, a single utterance is generated by the utterance generation component 60, which is then implemented by a text messenger component (in the case of an automated call center agent communicating by online chat) or speech synthesizer (in a telephonic automated call center agent). To provide (simulated) spontaneity, the single word lattice chosen for instantiation is preferably not necessarily the top-ranked word lattice, but rather the second, third, or possibly even lower-ranked word lattice may occasionally be chosen with some (generally decreasing) probability. Additionally or alternatively, (simulated) spontaneity can be achieved by occasionally traversing other than the highest-probability path in the case of a paraphrase variation, again with some probability that decreases with (e.g. scales with) the weights of the alternative paraphrase paths. If LM or other re-ranking is applied after instantiation, then two or more word lattices that are highest-ranked according to the conditional probabilities p($\tau$|DA type) may each be instantiated and the highest (or occasionally next-highest) LM-ranked instantiated utterance chosen for implementation by the automated agent.

In the case of a semi-automated call center device, the call center device provides assistance for a human call center agent, for example by listing one, two, or a few suggested utterances on the display component 46. In one approach, one or more highest-ranked word lattices are chosen in accord with the conditional probabilities p($\tau$|DA type). As just one example, a word lattice may be chosen for instantiation if it is (1) the top-ranked word lattice or (2) the second through fifth ranked word lattice and has conditional probability p($\tau$|DA type) greater than some minimum selection threshold. (The latter threshold constraint ensures the human agent is not presented with utterances generated from very low-ranked word lattices). In this case all chosen word lattices are preferably instantiated, and optionally are re-ranked using LM fluency ranking or the like, and all chosen word lattices are presented to the human call center agent on the display component 46. In this case, spontaneity is suitably achieved by (1) occasionally traversing other than the highest-probability path in paraphrase variations, and (2) relying upon the human agent to use his or her own spontaneity in selecting which (if any) of the displayed recommended utterances to text-message or articulate to the second party.

The disclosed automated call center system (or semi-automated call center support system) of FIG. 2, employing a computerized call center utterances manager constructed using the system of FIG. 1 operating in conjunction with a computerized call center dialog manager, has numerous advantages. The computer implementing the automated or semi-automated call center (support) system is improved because it can employ less storage (e.g. memory) by storing word lattices parameterized by variations labeled as slots or paraphrases (including synonyms). By comparison, storing an exhaustive set of utterances including various alternative (but semantically similar) utterance in order to mimic natural-sounding utterances requires substantially more memory, as does storing different utterances for different slot content. The use of word lattices representing clusters of training agent utterances, in general, reduces memory storage requirements as compared with storing exhaustive lists of possible utterances, and the disclosed word lattice path weighting and pruning techniques using a Natural Language Understanding component still further reduces memory requirements.

In another aspect, the computer implementing the automated or semi-automated call center (support) system is improved by producing more natural-sounding agent utterances (or agent utterance suggestions) with appropriate (simulated) spontaneous variations by leveraging the weighted and pruned word lattices representing training agent utterance clusters, along with the flexibility provided by the slot and paraphrase path variation classes.

Still further, such advantages are achieved while retaining existing dialog manager (DM) paradigms, and indeed leveraging the dialog act (DA) typography employed in such a DM to generate natural-sounding utterances that are appropriate for the particular DA while still having natural-sounding variations from utterance to utterance. The disclosed utterance generation component is also readily integrated with downstream processing such as the use of a language model (LM) to re-rank the utterance suggestions so as to incorporate a fluency metric into the utterance generation.

The training phase (FIG. 1) of the utterance generation component may be computationally intensive, and is preferably performed on a computer 12 (e.g. cloud resource, computing cluster, or so forth) with high computational capacity. However, the implementation phase of the utterance generation component in the call center context (FIG. 2) is computationally efficient. The performance of the computer implementing the utterance generation component is improved through the use of the generation templates and associated DA type conditional probabilities, where selection of dialog act type-specific utterances employs efficient ranking based on the conditional probabilities and the instantiation of utterances employs conventional and computationally efficient operations on WFSA representations of word lattices.

It will be further appreciated that the computational components disclosed herein may be physically represented by an electronic data processing device (e.g. illustrative devices 12, 44) programmed to perform the disclosed computations; and/or may be physically represented by a non-transitory storage medium storing such instructions executable by an electronic data processing device (e.g. illustrative devices 12, 44) to perform the disclosed computations. Such a non-transitory storage medium may, for example, including one or more of the following non-limiting examples: a hard disk drive or other magnetic storage medium; an optical disk or other optical storage medium; a solid state drive, flash memory, erasable programmable read-only-memory (EPROM) or other electronic storage; various combinations thereof; or so forth.

It should also be noted that while dialogs via online chat or telephone are illustrated, other call modalities are contemplated, such as a video call (which could be fully automated using an agent avatar, or may be performed with a human agent in a video conferencing environment) or email communications modality (where each utterance would be an email message parsed to remove email headers, signatures, or so forth).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A call center device operating in conjunction with a telephonic or online chat communication station, the call center device comprising:
a dialog manager configured to determine a recommended agent dialog act based on past dialog between a call center agent and a second party which is received from the telephonic or online chat communication station; and
an utterance generation component configured to generate at least one recommended agent utterance for implementing the recommended dialog act by operations including:
ranking a set of word lattices each represented as a weighted finite state automaton (WFSA) by conditional probabilities p(τ|DA type) where τ is a word lattice and DA type is a dialog act type of the recommended dialog act,
choosing at least one word lattice from the ranking, and instantiating the chosen at least one word lattice to generate the at least one recommended agent utterance;
wherein the dialog manager and the utterance generation component comprise at least one computer programmed to determine the recommended dialog act and to generate the at least one recommended agent utterance.

2. The call center device of claim 1 wherein the utterance generation component is configured to perform the instantiating by:
traversing the WFSA representing the chosen word lattice; and
substituting data provided to the utterance generation component by the dialog manager for any path variation of the WFSA that is identified as a slot.

3. The call center device of claim 1 wherein the utterance generation component is configured to perform the instantiating by:
traversing the WFSA representing the chosen word lattice; and
choosing one path of a path variation of the WFSA that is identified as a paraphrase based on weights of the paths of the paraphrase path variation.

4. The call center device of claim 1 further comprising:
a human-viewable display component configured to display the at least one utterance implementing the recommended dialog act.

5. The call center device of claim 1 wherein the telephonic or online chat communication station is an automated telephonic or online chat communication station and the call center device is configured to generate a single utterance implementing the recommended dialog act which is executed by a speech synthesizer or text messenger component of the automated telephonic or online chat communication station.

6. The call center device of claim 1 further comprising:
a training device comprising at least one computer configured to construct the set of word lattices from training dialogs between call center agents and second parties and to assign to the word lattices τ the conditional probabilities p(τ|DA type) over dialog act types DA type.

7. The call center device of claim 6 wherein the training device is configured to construct the set of word lattices by operations including:
extracting features to represent agent utterances of the training dialogs;
clustering the agent utterances of the training dialogs represented by the extracted features to form agent utterance clusters;
aligning the agent utterances of each cluster; and generating a word lattice represented as a weighted finite state automaton (WFSA) encoding the aligned agent utterances of each cluster.

8. The call center device of claim 7 wherein the extracting includes extracting context features to represent agent utterances from second party utterances of the training dialogs.

9. The call center device of claim 8 wherein the extracting further includes extracting grammatical dependency link features characterizing grammatical dependencies between words within agent utterances.

10. The call center device of claim 7 wherein the aligning comprises applying multiple sequence alignment (MSA) with sequences comprising the agent utterances and each agent utterance comprising words.

11. The call center device of claim 7 wherein the generating of a word lattice includes determining weights of sub-sequences of the word lattice based on numbers of agent utterances merged to form the sub-sequences.

12. The call center device of claim 7 wherein:
the training device is configured to construct the set of word lattices by further operations including classifying each path variation in the word lattices as a slot, a paraphrase, or neither; and
during the instantiating of the chosen at least one word lattice, the utterance generation component is configured to substitute data provided by the dialog manager for any slot path variation and to choose one path of any paraphrase path variation based on weights of the paths of the paraphrase path variation.

13. The call center device of claim 6 wherein:
the training device is further configured to classify each path variation in the word lattices as a slot, a paraphrase, or neither; and
during the instantiating of the chosen at least one word lattice, the utterance generation component is configured to substitute data provided by the dialog manager for any slot path variation and to choose one path of any paraphrase path variation based on weights of the paths of the paraphrase path variation.

14. The call center device of claim 6 wherein the training device is configured to assign to the word lattices τ the conditional probabilities p(τ|DA type) by operations that for each word lattice τ include:
sampling the word lattice τ to generate sample utterances;
labeling each sample utterance with conditional probabilities p(DA type|utt) where utt is the sample utterance and DA type is a dialog act type; and
generating the conditional probabilities p(τ|DA type) for the word lattice τ from the conditional probabilities p(DA type|utt) of the sample utterances.

15. The call center device of claim 14 wherein the conditional probabilities p(τ|DA type) for the word lattice τ are generated from the conditional probabilities p(DA type|utt) of the sample utterances using Baye's rule.

16. The call center device of claim 14 wherein the labeling comprises labeling each sample utterance with conditional probabilities p(DA type|utt) using a Natural Language Understanding component.

17. A non-transitory storage medium storing instructions readable and executable by one or more electronic data processing devices to perform a method for generating recommended agent utterances for implementing dialog acts recommended by a dialog manager of a call center, the method comprising:
constructing a set of word lattices each represented as a weighted finite state automaton (WFSA) from training dialogs between call center agents and second parties;
assigning to the word lattices conditional probabilities over dialog act type; and
for each recommended dialog act received from the dialog manager: (i) ranking the set of word lattices by the conditional probabilities for the dialog act type of the recommended dialog act, (ii) choosing at least one word lattice from the ranking, and (iii) instantiating the chosen at least one word lattice to generate at least one recommended agent utterance for implementing the recommended dialog act.

18. The non-transitory storage medium of claim 17 wherein the constructing includes:
extracting features to represent agent utterances of the training dialogs including at least (I) context features extracted from preceding second party utterances in the training dialogs and (II) grammatical dependency link features characterizing grammatical dependencies between words within agent utterances;
clustering the agent utterances of the training dialogs represented by the extracted features to form agent utterance clusters;
aligning the agent utterances of each cluster; and
generating a word lattice represented as a weighted finite state automaton (WFSA) encoding the aligned agent utterances of each cluster with weights of sub-sequences of the word lattice being based on numbers of agent utterances merged to form the sub-sequences.

19. The non-transitory storage medium of claim 17 wherein:
the constructing includes classifying at least some path variations in the word lattices as slots or paraphrases; and
during the instantiating of the chosen at least one word lattice, substituting data provided by the dialog manager for any slot path variation and to choosing one path of any paraphrase path variation based on weights of the paths of the paraphrase path variation.

20. The non-transitory storage medium of claim 17 wherein assigning to the word lattices conditional probabilities over dialog act type includes for each word lattice:
sampling the word lattice to generate sample utterances;
labeling each sample utterance with conditional probabilities p(DA type|utt) where utt is the sample utterance and DA type is a dialog act type, the labeling being performed using a Natural Language Understanding component; and
generating the conditional probabilities over dialog act type for the word lattice from the conditional probabilities p(DA type|utt) of the sample utterances using Baye's rule.

* * * * *